(12) United States Patent
Stoscher et al.

(10) Patent No.: US 7,207,753 B2
(45) Date of Patent: *Apr. 24, 2007

(54) APPARATUS AND METHOD FOR SHAPING AN EDGE OF A TILE

(76) Inventors: Dennis C Stoscher, 1720 Valley View, Belmont, CA (US) 94002; Enrique Rayon, 1731 Valley View, Belmont, CA (US) 94002

( * ) Notice: Subject to any disclaimer, the term of this patent is extended or adjusted under 35 U.S.C. 154(b) by 0 days.

This patent is subject to a terminal disclaimer.

(21) Appl. No.: 11/109,500

(22) Filed: Apr. 19, 2005

(65) Prior Publication Data

US 2006/0048373 A1 Mar. 9, 2006

Related U.S. Application Data

(63) Continuation of application No. 10/176,736, filed on Jun. 20, 2002, now Pat. No. 6,881,018.

(51) Int. Cl.
*B23C 1/00* (2006.01)
(52) U.S. Cl. ............... 409/132; 409/185; 409/145; 144/135.2; 29/33 P
(58) Field of Classification Search ........... 219/69.1; 451/12, 212; 29/33 P, 563; 409/132, 145, 409/158, 159, 172, 163, 164, 225, 227, 228, 409/229, 185, 190; 144/135.2, 117.3, 253.1; 83/36, 206, 277, 412, 437.1, 453; 269/60
See application file for complete search history.

(56) References Cited

U.S. PATENT DOCUMENTS

| | | | | |
|---|---|---|---|---|
| 4,187,601 A * | 2/1980 | Aldrin | ............... | 29/560 |
| 4,224,854 A * | 9/1980 | Malacheski et al. | ........... | 83/475 |
| 4,456,043 A * | 6/1984 | Stocks | ............... | 144/136.95 |
| 4,526,354 A * | 7/1985 | Mannes | ............... | 269/93 |
| 4,552,193 A * | 11/1985 | Armas | ............... | 409/130 |
| 4,645,391 A * | 2/1987 | Fallert | ............... | 409/225 |
| 4,750,254 A * | 6/1988 | Kalmbach | ............... | 29/561 |
| 4,945,958 A * | 8/1990 | Shoda | ............... | 409/217 |
| 4,987,668 A * | 1/1991 | Roesch | ............... | 409/145 |
| 5,002,265 A * | 3/1991 | Burt et al. | ............... | 269/93 |
| 5,094,282 A * | 3/1992 | Suzuki et al. | ............... | 144/356 |
| 5,160,124 A * | 11/1992 | Yamada et al. | ............... | 269/25 |
| 5,415,581 A * | 5/1995 | Bando | ............... | 451/67 |
| 5,549,509 A * | 8/1996 | Hirst et al. | ............... | 451/178 |
| 6,679,659 B1 * | 1/2004 | Lasch et al. | ............... | 409/235 |
| 6,743,128 B2 * | 6/2004 | Liechty, II | ............... | 30/357 |
| 6,796,886 B2 * | 9/2004 | Bushell | ............... | 451/182 |

* cited by examiner

*Primary Examiner*—Dana Ross
(74) *Attorney, Agent, or Firm*—Patrick Reilly

(57) ABSTRACT

An apparatus and method for shaping an edge of a tile. The preferred embodiment enables an operator to place a tile between an elevator and a reference plate. The operator snugs the edge of the tile up against a reference plate, and causes the elevator to press the tile towards the reference plate. The reference plate and the elevator are coupled with a transporter. The transporter is moved to maintain the tile in contact the guide surface, whereby the edge is placed into an edge shaping zone of a shaping tool, such as a router bit or a saw. Two or more shaping tools may be placed in series along the guide surface whereby the edge may be successively shaped by each shaping tool in a two or multi-stage process. A motor and a lead screw or a chain may be used to move the transporter and tile.

19 Claims, 6 Drawing Sheets

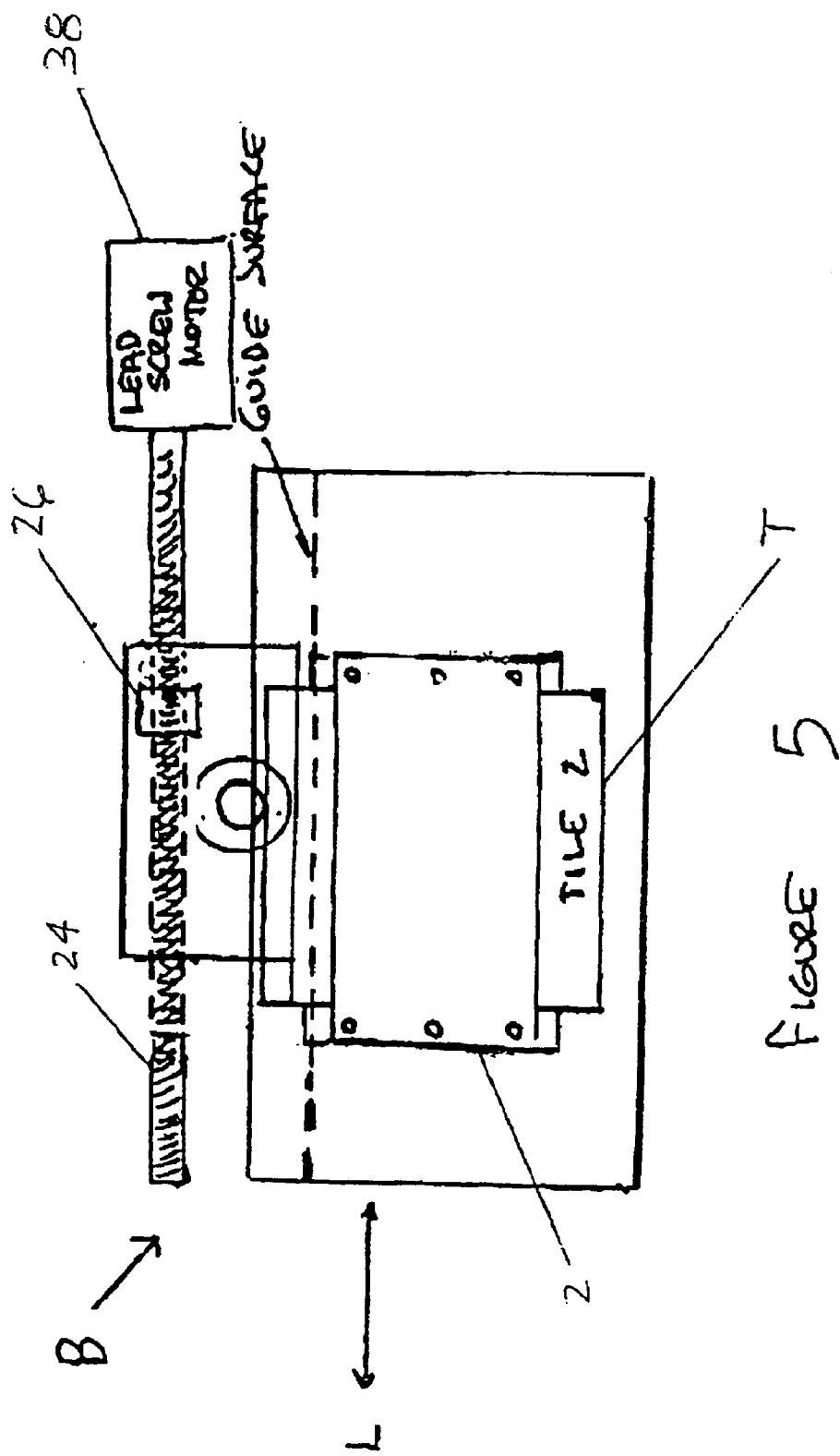

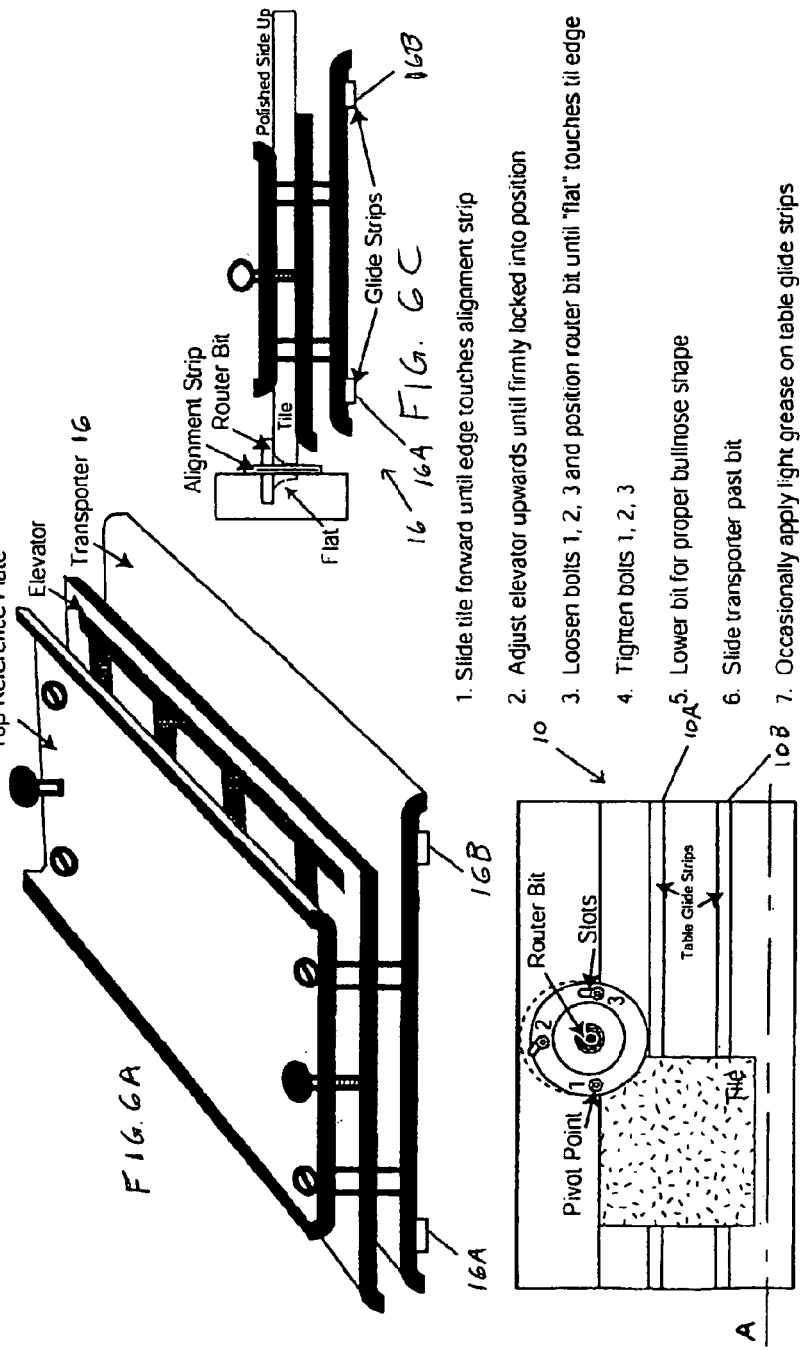

APPARATUS AND METHOD FOR SHAPING AN EDGE OF A TILE

RELATED APPLICATIONS

This patent application is a Continuation to U.S. patent application Ser. No. 10/176,736 filed on Jun. 20, 2002 now U.S. Pat. No. 6,881,018 and claims the benefit of the priority date of that U.S. patent application Ser. No. 10/176,736. The aforementioned U.S. patent application Ser. No. 09/176,736 is hereby incorporated in its entirety and for all purposes in this patent application.

FIELD OF THE INVENTION

The present invention relates to systems for edging tile. More particularly, the present invention addresses the needs of tile installlation persons, stoneworkers, construction workers and artisans in shaping the edges of tiled materials.

BACKGROUND OF THE INVENTION

Tiles are used in numerous applications where it is desirable to shape one or more edges of a tile or tiles at the location where the tiles are being installed. In particular, tiles of natural origin and composition, e.g., marble, granite or wood, often have coloring and shading characteristics shared within a batch of the material that make it difficult to optimally pre-cut or pre-shape an individual tile without closely observing the intended placement of a given tile in relationship to other tiles of the batch and the installation site. Furthermore, many tiles of natural origin, as well as porcelain, ceramic, brick, concrete block and certain engineered stone types, may not consistently present dimensions within tight tolerances of shape and planarity.

The prior art provides manual techniques for shaping an edge in slow and cumbersome steps. The prior art approaches using automated systems or machining tools are not generally economically feasible for on-site applications. Additionally, the prior art approaches are further reduced in efficiency when applied to tiles having dimensional tolerances outside of narrow ranges.

OBJECTS OF THE INVENTION

It is an object of the present invention to provide a technique that enables a worker or operator to shape an edge of a tile.

It is a further optional object of the present invention to provide an apparatus that is used to shape an edge of a tile.

SUMMARY OF THE INVENTION

These and other objects and advantages of the present invention are achieved by the method of the present invention wherein an apparatus and method are provided for use in shaping an edge of a tile. A first preferred embodiment of the invented apparatus has a base, a stage and a shaping tool. The stage holds the tile and while the stage and the tile are moved along a bed of the base and the edge is passed through a shaping zone of the shaping tool. The edge and stage are guided in their pathway along the bed by a guide surface. In the first preferred embodiment the edge is pressed against a reference stop. A pressing element is then engaged to press an elevator of the stage against a first surface of the tile and towards a reference plate of the stage. A second surface of the tile is thereby pressed against the reference plate. The elevator of the first preferred embodiment is movably coupled to the pressing element and the reference plate. The reference plate is rigidly coupled with a transporter of the stage. The transporter is slidably coupled with the bed of the base. The stage may be moved or slid along the bed of the base and the edge may then be shaped by the action of a shaping element of the shaping tool. This shaping of the edge substantially occurs or is initiated while the edge is within the shaping zone.

The first preferred embodiment may have one or more optional and additional shaping tools, whereby the edge is successively moved through two or more shaping tools and more finely shaped. A shaping tool may be or comprise a router and a router bit, a saw, a grinder, a knife, a blade, a polisher, a heating element, or other suitable tile shaping element known in the art. Each shaping tool may optionally be detachably coupled with the base.

Additionally or alternatively, certain preferred embodiments of the present invention may have one or more optional and additional motors and driving elements, wherein the driving element is attached to stage and the motor empowers the driving element to move the stage and the edge through or into the shaping zone of the shaping tool. The first preferred embodiment may have an optional chain as the driving element. A second preferred embodiment may have a lead screw and a tapped bushing as the optional driving element. Certain alternate preferred embodiments of the present invention comprise a toothed belt and a complementary motor driven toothed or tooth receiving pulley.

The pressing element of the first preferred embodiment includes a threaded shaft with an elevator end and a floating end. The elevator end is attached to the elevator and the threaded shaft extends from the elevator and through a receiver of the reference plate. A tapped bushing is located on the threaded shaft and between the reference plate and the floating end of the threaded shaft. The tapped bushing is positioned, sized and shaped to not pass through the reference plate receiver while the tile is in the shaping zone of the shaping tool. The tapped bushing is driven, or caused to be driven, by the operator towards the reference plate in order to apply pressure between the reference plate and the tile and between the elevator and the tile. The tile is thereby held by the reference plate and the elevator while passing through the shaping zone of the shaping tool.

It is an optional characteristic of the method of the present invention that if the pressure applied in capturing the tile within the stage is insufficient, then the shaping element will push the tile away without eliminating a potential to reposition the tile and try again to shape the tile properly by means of the present invention.

According to the method of the present invention, an operator may place the tile between the elevator and the reference plate while pushing the edge against a reference stop of the base. The operator may then enable the pressing element to capture the tile in between the reference plate and the elevator. The operator may then drive the edge into and through the shaping zone of the tool by sliding the stage along the bed of the base while the edge is positioning in motion in relationship to the guide surface. The operator may use an optional motor and driving element to drive the stage and the edge across the bed of the base through one or more shaping zones of one or more shaping tools.

A third preferred embodiment of the present invention comprises a shaping tool movably coupled with the base. The tile remains stationary between the reference plate and the elevator while the shaping tool engages and cuts or otherwise shapes one or more tile edges.

Certain alternate preferred embodiments of the present invention are structured to shape an edge of a tile wherein a top surface of the tile is substantially planar but not necessarily parallel to a bottom surface of the tile.

The foregoing and other objects, features and advantages will be apparent from the following description of the preferred embodiment of the invention as illustrated in the accompanying drawings.

BRIEF DESCRIPTION OF THE DRAWINGS

These, and further features of the invention, may be better understood with reference to the accompanying specification and drawings depicting the preferred embodiment, in which:

FIG. 5 is a cut-away side view of a third preferred embodiment of the present invention having a shaping tool that is movably coupled with the base and wherein the tool is moved and the tile remains stationary during the shaping of a tile edge.

FIG. 6A is perspective view of the first preferred embodiment of the present invention of FIG. 1.

FIG. 6B is a top view of the first preferred embodiment of the present invention of FIG. 1.

FIG. 6C is a cut-away side-view of the first preferred embodiment of the present invention of FIG. 1.

DETAILED DESCRIPTIONS OF PREFERRED EMBODIMENTS

In describing the preferred embodiments, certain terminology will be utilized for the sake of clarity. Such terminology is intended to encompass the recited embodiment, as well as all technical equivalents which operate in a similar manner for a similar purpose to achieve a similar result.

Figure 1:
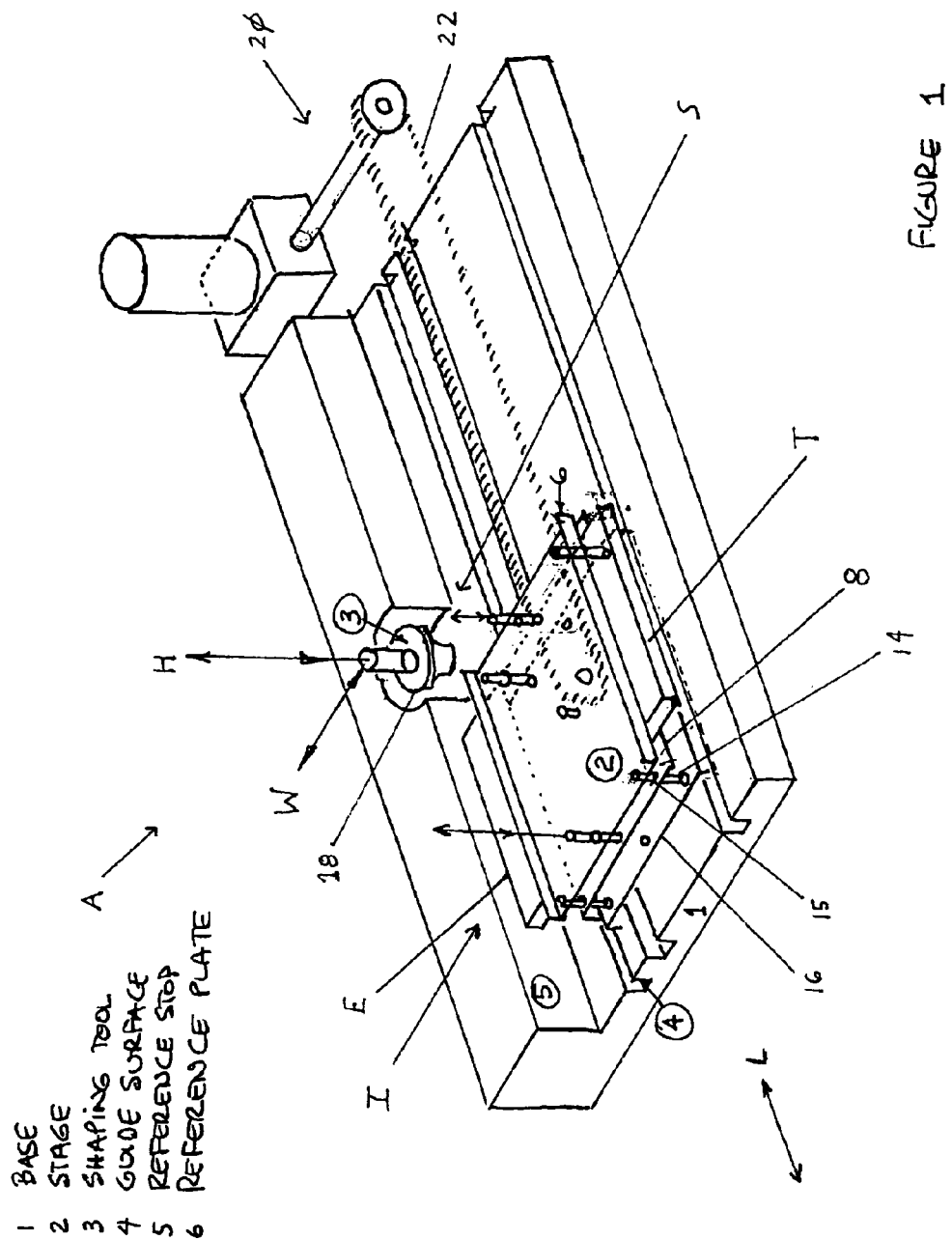
FIG. 1 is a perspective view of a first preferred embodiment of the present invention.
Figure 2:
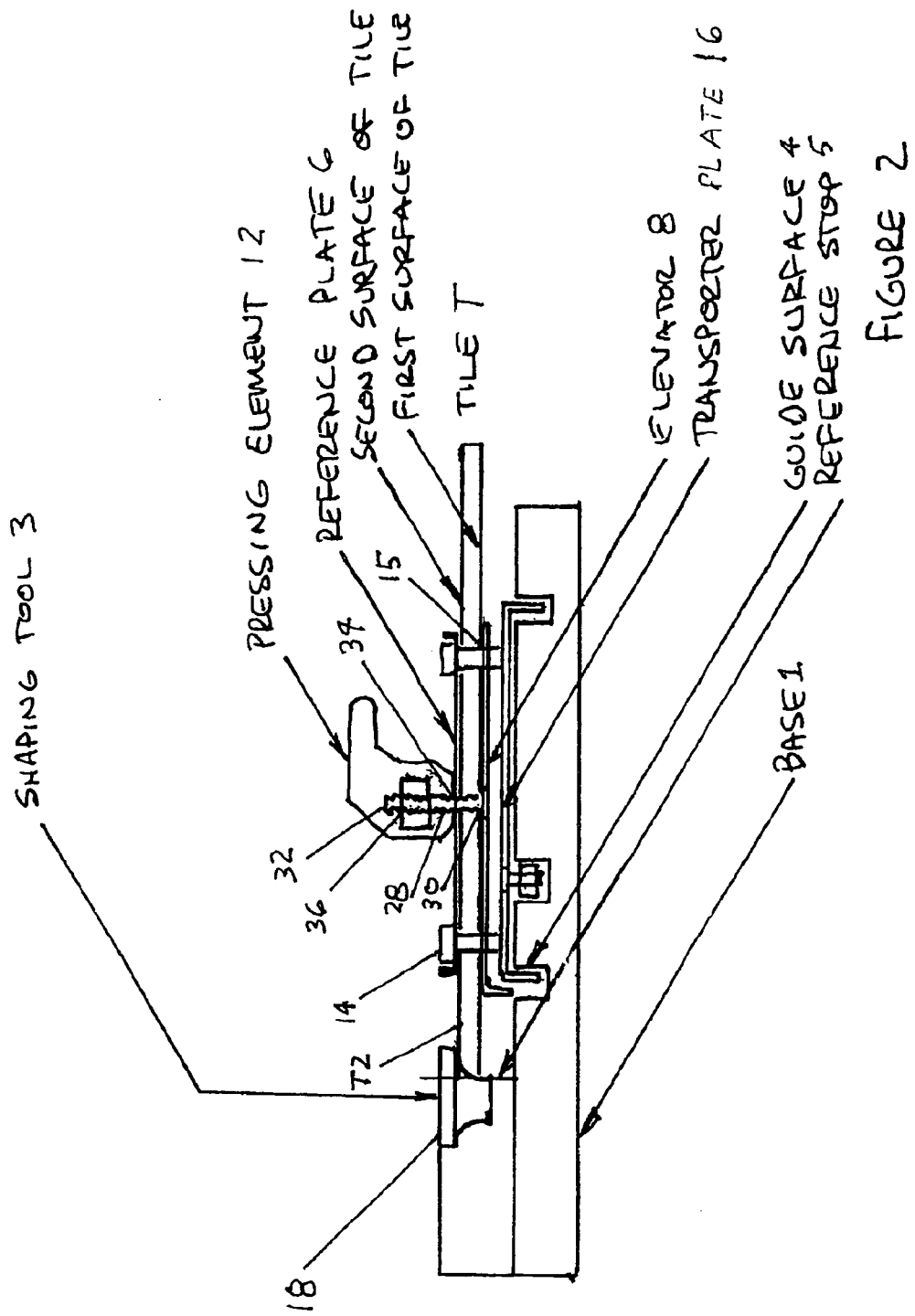
FIG. 2 is a cut-away side view of the first preferred embodiment of the present invention of FIG. 1.
Figure 3:
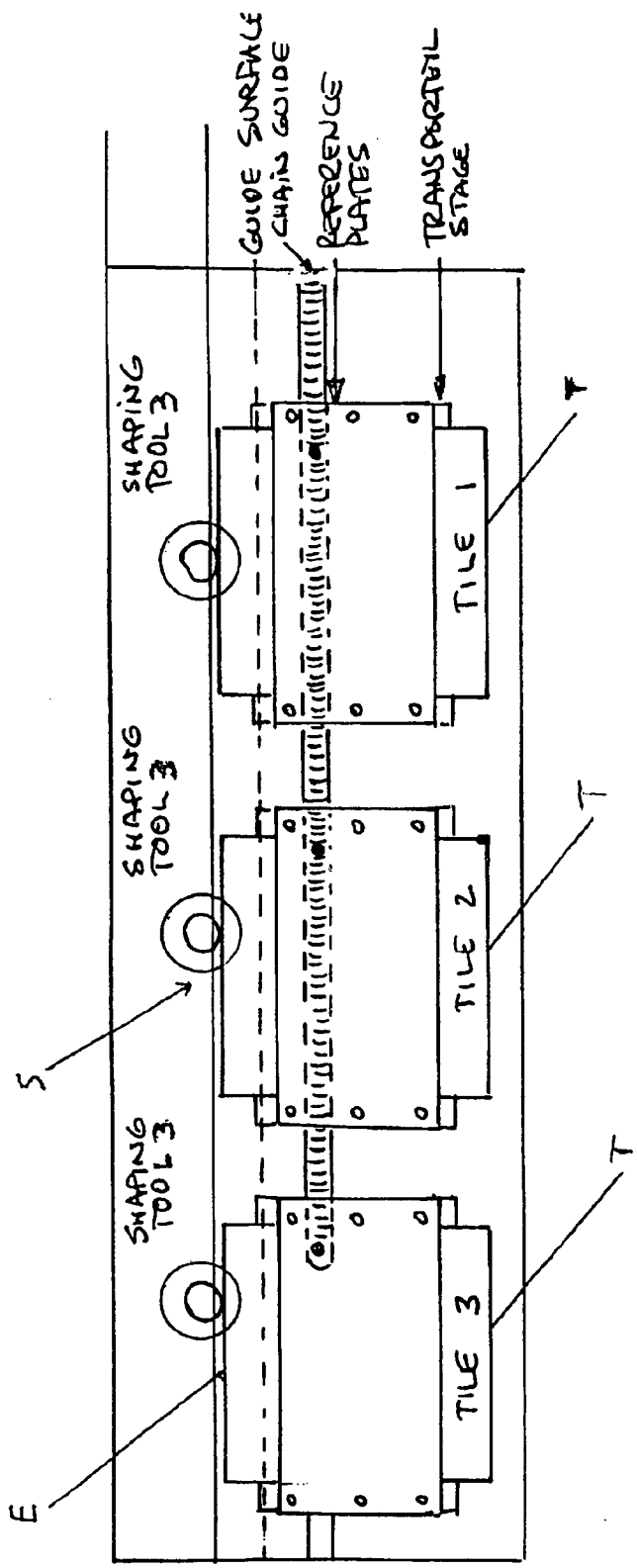
FIG. 3 is a top view of the first preferred embodiment of the present invention of FIG. 1 having two additional shaping tools attached to a base of the first preferred embodiment.

Referring now to the Figures and particularly to FIGS. 1, 2 and 3, a first preferred embodiment of the present invention, or first system A, has a base 1, a transporter stage 2 and a shaping tool 3. The base 1 has a guide surface 4 and a reference stop 5. The transporter stage 2, or stage 2, has a reference plate 6 and an elevator 8. The stage 2 holds the tile T and while the stage 2 and the tile T are moved along a bed 10 of the base 1 and an edge E of the tile is passed through a shaping zone S of the shaping tool 3. The edge E and stage 2 are guided in their pathway along the guide surface 4 of the bed 10 of the base 1. In the first system A the edge E is pressed by an operator against the reference stop 5. Reference stop 5 is planar and is parallel to the planar guide surface 4. A pressing element 12 is then engaged to press the elevator 8 of the stage 2 against a first surface T1 of the tile T and towards a reference plate of the stage 2. A second surface T2 of the tile T is thereby pressed against the reference plate 6. The first surface T1 may be substantially less planar, smoothed, polished or finished than the second surface T2. The elevator 8 of the first system A is movably coupled to the pressing element 12 and the reference plate 6 by posts 14. Posts 14 pass through apertures 15 of the elevator 8 and rigidly couple the reference plate 6 to a transporter plate 16 of the stage 2. The transporter plate 16 is slidably coupled with the bed 10 of the base 1. The stage 2 may be moved or slid along the bed 10 of the base 1 and the edge E may then be shaped by the action of a shaping element 18 of the shaping tool 3. This shaping of the edge E substantially occurs or is initiated while the edge E is within the shaping zone S.

The first system A is presented in FIG. 1 having a height along axis H, a width along axis W and length along axis L. The H, W and L axes are each mutually orthogonal. Where the tile T is up to 24 inches in width along axis W, and up to 24 inches in length along axis L, the base 1 will be over 48 inches in length in axis L and preferably on the order of twelve inches in width along axis W. The base 1 has a length dimension of more than two times the length of the tile T that allows the tile T to be located between the reference plate and the elevator in an initial position I and in no contact with the shaping tool 3, and then allows the tile T to be moved fully past (along axis L) the shaping tool 3, whereby the entire edge is engaged or shaped by the shaping element 18. The reference plate will preferably be approximately four inches in width along axis W and two inches longer then the length of the tile T. Where the tile T is Tw inches in width along axis W and T1 inches in length along axis L, the base 1 is preferably more than twice T1 in length along axis L and preferably on the order of one half Tw along the axis W.

The first system A is comprised of a suitable metal, metals and/or other suitable durable and rigid materials known in the art.

Referring now generally to the Figures and particularly to FIG. 3, the first system A may have one or more optional and additional shaping tools 3, whereby the edge E is successively moved through two or more shaping tools 3 and more finely shaped. The shaping tool 3 may be or comprise a router and a router bit, a saw, a grinder, a knife, a blade, a polisher, a heating element, or other suitable tile shaping element known in the art. Each shaping tool 3 may optionally be detachably coupled with the base 1.

Figure 4:
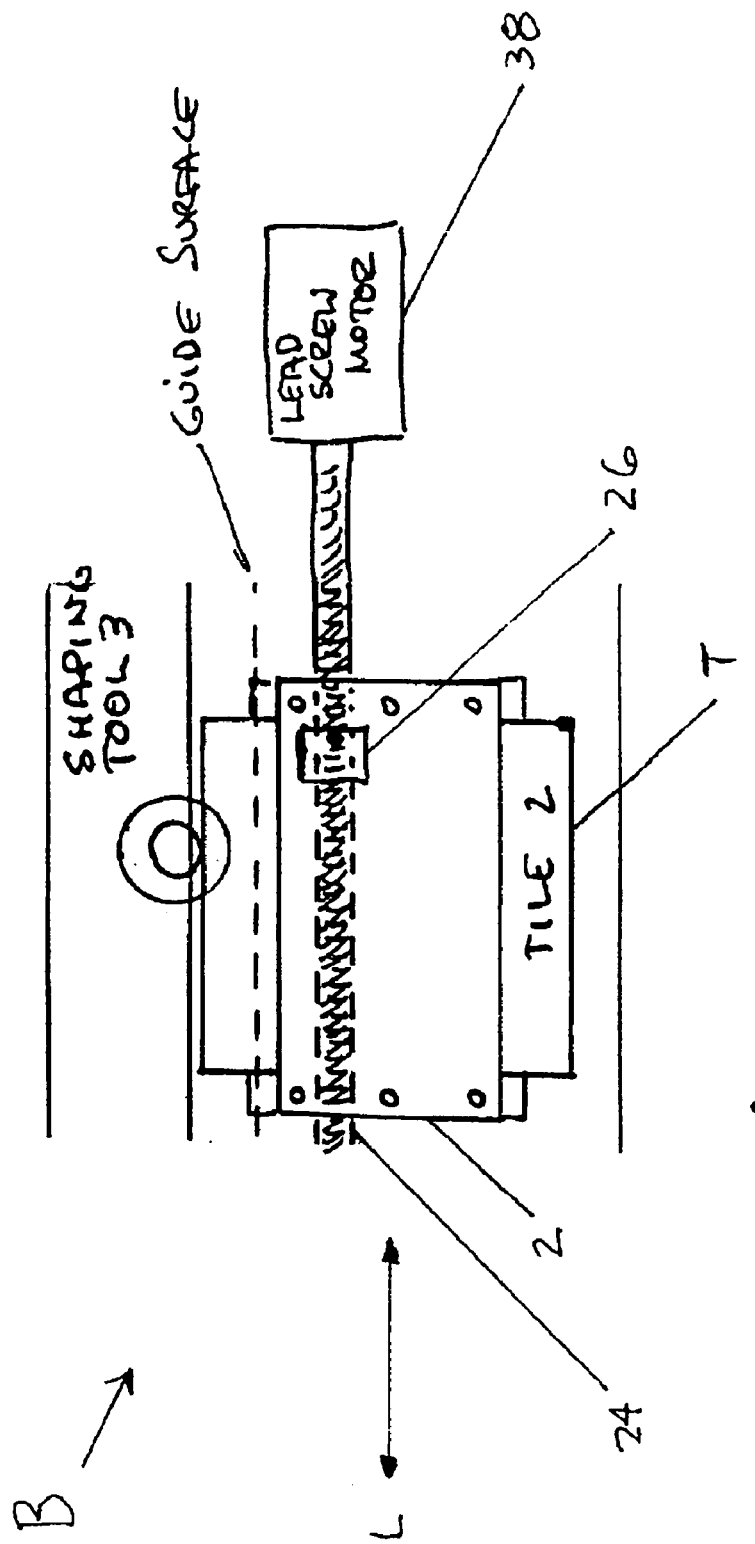
FIG. 4 is a top view of a second preferred embodiment of the present invention having a lead screw.

Additionally or alternatively, certain preferred embodiments of the present invention may have one or more optional and additional motors 20 and driving elements 22, wherein the driving element 22 is attached to the stage 2 and the motor 20 empowers the driving element 22 to move the stage 2 and the edge E into and/or through the shaping zone S of the shaping tool 3. The driving element 22 may be or comprise a chain or a toothed belt, or another suitable element for driving linear motion known in the art. As shown in FIG. 4, second preferred embodiment of the present invention may have a lead screw 24 and a tapped bushing 26 as the optional driving element 22.

The pressing element 12 of the first system A includes a threaded shaft 28 with an elevator end 30 and a floating end 32. The elevator end 30 is attached to the elevator 8 and the threaded shaft 28 extends from the elevator 8 and through an aperture 34 of the reference plate 6. A tapped bushing 36 is located around and engaged by the threaded shaft 28. The tapped bushing 36 is movable between the reference plate 6 and the floating end 32 of the threaded shaft. The tapped bushing 36 is positioned, sized and shaped to not pass through the reference plate aperture 34 while the tile T is in the shaping zone S of the shaping tool 3. The tapped bushing 36 is driven, or caused to be driven, by the operator towards the reference plate 6 in order to apply pressure between the reference plate 6 and the tile T and between the elevator 8 and the tile T. The tile T is thereby held by the reference plate 6 and the elevator 8 while the Tile T passes through the shaping zone S of the shaping tool 3.

It is an optional characteristic of the method of the present invention that if the pressure applied in capturing the tile T within the stage 2 is insufficient, then the shaping element 18 will push the tile T away without eliminating a potential to reposition the tile T and try again to shape the tile T properly by means of the present invention.

Referring now to the Figures and particularly to FIG. 4, a second preferred embodiment of the present invention B has a lead screw 24 and a threaded bushing 26 as the driving element 22. The lead screw 24 is attached to a lead screw motor 38 and the motor 38 rotates the lead screw 24. The bushing 26 is attached to the stage 2 and the stage 2 is moved along axis L and along the length of the lead screw 24 as the motor 38 rotates the lead screw 24.

Referring now to the Figures and particularly to FIG. 5, a third preferred embodiment of the present invention C, or third system C, comprises the shaping tool 3 that is movably coupled with the stage 2. The tile T is pressed between reference plate 6 and the elevator 8 and held stationary while the shaping tool 3 is moved against or toward the edge E. In the third system 3, the length of the base 1 may be reduced in length along axis L, as the bed 10 is not required to support movement of the stage 2. Those skilled in the art will appreciate that various adaptations and modifications of the just-described preferred embodiments can be configured without departing from the scope and spirit of the invention. Saws, cutting devices, and material shaping tools can be applied in numerous specific modalities by one skilled in the art and in light of the description of the present invention described herein. Therefore, it is to be understood that the invention may be practiced other than as specifically described herein.

The invention claimed is:

1. A tile shaping system for shaping a tile, the tile having a first surface and a second surface and an edge, the first surface being substantially planar, and the edge extending from the first surface to the second surface, the tile shaping system comprising: a base means, a transporter stage and a first shaping tool, wherein the first shaping tool and the transporter stage are slidably coupled with the base means; the base means for guiding the movement of the edge and the transporter stage as the edge moves through the tile shaping system; the transporter stage having a transporter plate, a reference plate, an elevator and a pressing element, the reference plate rigidly coupled to the transporter plate, and the elevator movably coupled to the pressing element and the reference plate, and the pressing element coupled with the reference plate and the elevator, wherein the elevator is driven towards the reference plate by the pressing element; and the transporter stage slidably coupled with the base means, wherein the tile is placed between the elevator and the reference plate and the edge is pressed against the base means and is movably coupled with the base means, the tile is pressed towards the reference plate by the elevator and the pressing element while the transporter stage is moved through a first shaping zone of the first shaping tool and the edge is shaped.

2. The system of claim 1, wherein the first shaping tool comprises a router and a shaping bit, the router for rotating the shaping bit and the shaping bit for contacting and shaping the edge.

3. The system of claim 1, wherein the first shaping tool comprises a shaping element selected from the group consisting of a saw, a grinder, a knife, a blade, a heating element and a polisher.

4. The system of claim 1, wherein the system further comprises a motor and a driving element, the driving element coupled with the transporter stage and the motor, whereby the motor moves the driving element and the driving element moves the transporter stage, and the edge is moved through the first shaping zone of the first shaping tool.

5. The system of claim 4, wherein the driving element is a chain.

6. The system of claim 4, wherein the driving element is a lead screw.

7. The system of claim 1, wherein the pressing element comprises a tapped bushing movably coupled with a threaded shaft, wherein the threaded shaft is coupled with the elevator and the tapped bushing adjusts the position of the elevator relative to the reference plate as the tapped bushing is moved along the threaded shaft, whereby the tile is pressed against the reference plate by the elevator.

8. The system of claim 1, wherein the pressing element comprises a tapped bushing movably coupled with a threaded shaft, wherein the threaded shaft is coupled with the reference plate and the tapped bushing adjusts the position of the elevator relative to the reference plate as the tapped bushing is moved along the threaded shaft, whereby the tile is pressed against the reference plate by the elevator.

9. The system of claim 1, wherein the first shaping tool is detachably attached to the base means.

10. The system of claim 1, wherein the system further comprises a second shaping tool, wherein the second shaping tool is coupled with the base means in series with the first shaping tool, and whereby the transporter stage may pass the edge through a second shaping zone of the second shaping tool after passing the edge through the first shaping zone of the first shaping tool.

11. The system of claim 10, wherein the system further comprises a motor and a driving element, the driving element coupled with the transporter stage and the motor, whereby the motor moves the driving element and the driving element moves the transporter stage, and the edge is moved through the first and second shaping zones of the first shaping tool and the second shaping tool.

12. The system of claim 10, wherein the system further comprises a third shaping tool, wherein the third shaping tool is coupled with the base means in series with second shaping tool, and whereby the transporter stage passes the edge through a third shaping zone of the third shaping tool after passing the edge through the second shaping zone of the second shaping tool.

13. The system of claim 12, wherein the system further comprises a motor and a driving element, the driving element coupled with the transporter stage and the motor, whereby the motor moves the driving element and the driving element moves the transporter stage, and the edge is moved through the first second and third shaping zones of the first shaping tool, the second shaping tool and the third shaping tool.

14. A method for shaping an edge of a tile, the method comprising: a. providing the tile, the tile having a first surface and a second surface and an edge, the second surface being substantially planar, and the edge extending from the first surface to the second surface; b. providing a tile shaping system, the tile shaping system comprising: a base means, a transporter stage and a first shaping tool, wherein the first shaping tool is coupled with the base means and the transporter stage is slidably coupled with the base means, the base means and the guide surface for guiding the movement of the edge and the transporter stage as the edge moves through the tile shaping system; the transporter stage having a transporter plate, a reference plate, an elevator and a pressing element, the transporter stage slidably coupled with the base means, the reference plate rigidly coupled with transporter plate, and the elevator movably coupled to the pressing element and the reference plate, and the pressing element coupled with the reference plate and the elevator, wherein the elevator is driven towards the reference plate by the pressing element; c. placing the tile between the elevator and the reference plate, wherein the second surface of the tile is in contact with the reference plate; d. positioning the tile in relationship to and against the guide surface; enabling the pressing element to press the elevator against the tile and towards the reference plate; and e. moving the edge through a first shaping zone of the first shaping tool by moving the transporter stage in relationship to and in reference with the guide surface, whereby the transporter stage is moved through the first shaping zone of the first shaping tool and the edge is shaped.

15. The method of claim 14, wherein the first shaping tool comprises a shaping element selected from the group consisting of a router bit, a saw, a grinder, a knife, a heating element and a polisher.

16. The method of claim 14, wherein the tile shaping system further comprises a motor and a driving element, the driving element coupled with the transporter stage and the motor, whereby the motor moves the driving element and the driving element moves the transporter stage, and the edge is moved through the first shaping zone of the first shaping tool.

17. The system of claim 16, wherein the driving element is a chain.

18. The system of claim 16, wherein the driving element is a lead screw.

19. The method of claim 14, wherein the tile shaping system further comprises a second shaping tool, wherein the second shaping tool is coupled with the guide surface in series with the first shaping tool, and whereby the transporter stage may pass the edge through a second shaping zone of the second shaping tool after passing the edge through the first shaping zone of the first shaping tool.

* * * * *